Figure 1:
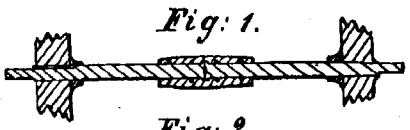
Figure 2:
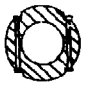
Figure 3:
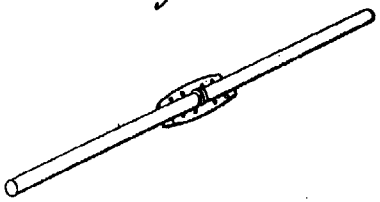
Figure 4:
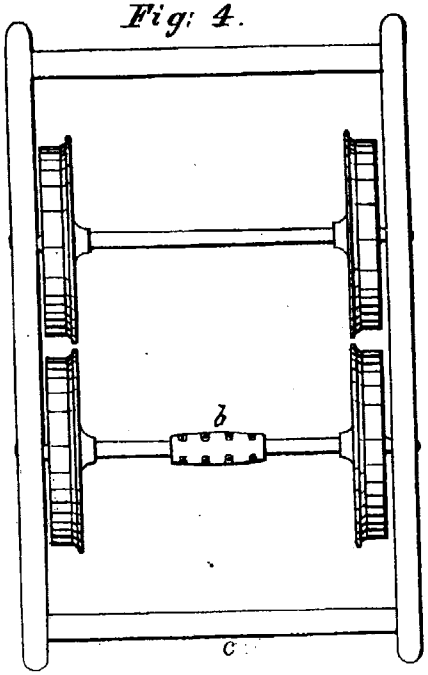

8466X

J. Stimpson.

Car Axle.

Patented Oct. 23, 1834.

N. PETERS, PHOTO-LITHOGRAPHER, WASHINGTON, D. C.

[illegible] 66 X Oct. 23 1834 [illegible]

James Stimpson Baltimore Maryland

Letters Patent

[illegible] Schedule referred to in these Letters Patent and making part of the same containing a description in the words of the said James Stimpson himself of his improvement in the Running gears of Rail Road Carriages

[illegible] all to whom these presents shall come: Be it known that I James Stimpson of the City and County of Baltimore and State of Maryland have invented a new and useful improvement in the running gears of Rail Road Carriages and that the following is a full and exact description of the construction and operation of said improvement as invented or improved by me. I make a joint in the centre [illegible] of the axles which jointed axle should always be in the hind [illegible] of the carriage when running. this joint I connect by a coupling box or by letting one shaft into the other. and if the former [illegible] it may be made in the following or in any other way that may be preferred. I form a rim or flanch (by upsetting or otherwise) upon the middle ends of each of the half axles where they meet together and make these flanches in the finish about a quarter of an inch deep or larger all round than the axles and the same in thickness more or less and turn them off to an exact size. and face them up [illegible] each other and turn the ends a very little concave within or [illegible] the face of the rim or flanch so that they may not touch each other [illegible] the centre and that the cavity formed may contain oil [illegible] should be turned exactly straight and of a size as far from the fla[illegible] [illegible] as the coupling is intended to reach. The coupling box should be made of two parts divided in the centre longitudinally [illegible] feet long more or less. it should be swelled considerably [illegible] centre than at the ends in order that a sufficient thick[illegible] [illegible] be left to cover the rims or flanches formed on said axles [illegible] strength at their junction and the coupling box [illegible] [illegible] together by strong screw bolts with nuts. or [illegible]

[illegible]

may be secured by iron hoops if prefered: thus when said coupling box is
thus closed together. it may be drilled out exactly to fit the size of the axles
on each side of the aforesaid rims or flanches it should then have a groove
turned out within its centre of a depth and width sufficient to
to fit upon both of said rims or flanches when they are placed close
together so that there will be no loose play in any part, and that when
said coupling box is bolted or closed fast upon said axles the axle
will be as secure from loose play in any direction as though it was
solid except that of their being allowed to turn round in different
directions in said coupling or it may be made in any other way if
preferred. It will be seen that when running upon a straight road
if all the wheels were of equal diameters. which by the by is very seldom
the case. there would be no movement of the half axles within the coup
ling and when running upon a curve. if the axle was two inches and
three quarters in diameter and the wheels thirty six. it would then
be only in movement as two and three quarters are to thirty six.
while the distance the coupling is from the wheels affords so much power
over the wheels by leverage that but a very small degree of stress
within the box can be brought to act upon it. Now let us con
sider the effect of the effect of the steering power afforded by the [illegible]
The hind wheels must yield to the slightest impulse. the cone;
then upon the forward wheels can direct the course of the carriage
with nearly as much ease as though they were running by themselves
independent of the carriage: thus steering a direct course with the
road and at the same time effecting what was contemplated by the use
of vibrating axles. while it avoids the dangers resulting therefrom &
this; i.e. with wheels all made fast to their axles and the axles themselves
keep perfectly parallel to each other and thereby avoiding all the in-
jury and loss of property resulting from the application of loose wheels
and saves as much of the propelling power in their movements as is
necessary very often to make the wheels slip upon the rails when
all the wheels are made fast to their axles and no joint used.
I have no doubt that a set of wheels with this improvement and

[illegible] ets as heretofore used upon Roads as serpentine as those of the [illegible] or Baltimore and Ohio Rail Road. No article [illegible] in itself in use at the present day upon Rail Roads can in any way compare with it in usefulness. The beneficial effects of the joint in one of the axles may be illustrated by considering the following points which call for an easement to motion after bringing to mind a fact which will be readily understood by those in the least acquainted with the subject.

When four wheels made fast to two axles which are confined in close boxes parallel to each other (bearing in mind the power of adhesion the wheels have to the rails) requires that all the wheels or points in contact, should always be exactly alike in size. Supposing then one wheel to be one thousandth part less than the others then after a thousand revolutions take place. the three would run a distance farther than the other equal to their whole circumference if they [illegible] all which time the small wheel would have to slide that distance upon the rail and its power of action upon the axle would be equal to the difference in their diameters which in most cases is as twelve to one. and that multiplied by the adhesion of the wheel to the rail. which is at least three hundred pounds the stress upon the axle would be all of thirty six hundred pounds and suppose it happened to be the case with two wheels. and they placed upon the diagonal corners of the carriage it would go straight ahead but the extra power required to move it would be equal to that of making the the two wheels slip and this is an evil that will not [illegible] increase the difficulty continually for the slipping will [illegible] [illegible] of the small wheel. Then take into view its power [illegible] train of cars as to the moving power. the constant wear and tear of wheels and rails [illegible] the importance of this joint will be more fully comprehended. Many [illegible] very important points might be cited of great magnitude. but this is not [illegible] place for a dissertation upon such matters.

[illegible] by way of experiment to some extent as above described and [illegible] satisfactory and eminently useful under various speeds up [illegible] miles per hour and could never perceive any difference in [illegible] the variation of speed. What I claim as new is the applition of the joint to one of the axles of any description of Rail Road carriages and Locomotives. whereby to allow the hind wheels to yield to the direction required to be given by any change in the direction of the Road or to the conical form of the wheels upon the fore axle: or any other mode whereby the same object is obtained by the same principles of action or construction. and also for all other carriages to which it may be beneficially applied Sgd. Witnesses

[illegible] Julia M. Stimpson

James H. Stimpson

James Stimpson

Drawing

[7442]